United States Patent
Slupecki et al.

(10) Patent No.: US 8,100,141 B2
(45) Date of Patent: Jan. 24, 2012

(54) WATER SUPPLY CONTROL ASSEMBLY WITH AUTOMATIC SHUT-OFF AND DUTY CYCLE RESET

(76) Inventors: Raymond H. Slupecki, Carrollton, TX (US); J. Thomas Miller, Dallas, TX (US)

( * ) Notice: Subject to any disclaimer, the term of this patent is extended or adjusted under 35 U.S.C. 154(b) by 0 days.

(21) Appl. No.: 12/788,319

(22) Filed: May 27, 2010

(65) Prior Publication Data

US 2011/0290350 A1  Dec. 1, 2011

(51) Int. Cl.
*F16K 17/00* (2006.01)
(52) U.S. Cl. ......... 137/456; 137/460; 251/248; 318/256
(58) Field of Classification Search ................. 137/456, 137/554, 460; 251/249, 248, 250.5, 129.11; 475/1; 318/474, 256
See application file for complete search history.

(56) References Cited

U.S. PATENT DOCUMENTS

| | | | |
|---|---|---|---|
| 1,330,790 A * | 2/1920 | Dean | 318/13 |
| 2,044,197 A | 6/1936 | Barthel | |
| 4,873,650 A | 10/1989 | Reeves, Jr. | |
| 4,921,012 A | 5/1990 | Bratten | |
| 5,038,820 A | 8/1991 | Ames et al. | |
| 5,161,563 A | 11/1992 | Thompson | |
| 5,409,037 A | 4/1995 | Wheeler et al. | |
| 5,568,825 A | 10/1996 | Faulk | |
| 5,771,920 A | 6/1998 | Jewett et al. | |
| 5,782,263 A | 7/1998 | Isaacson, Jr. et al. | |
| 5,920,265 A * | 7/1999 | Johnson et al. | 340/605 |
| 6,186,162 B1 | 2/2001 | Purvis et al. | |
| 6,880,574 B1 | 4/2005 | Porto | |
| 7,032,435 B2 | 4/2006 | Hassenflug | |
| 7,383,721 B2 * | 6/2008 | Parsons et al. | 73/46 |

FOREIGN PATENT DOCUMENTS

WO  WO2008088166  * 7/2008

* cited by examiner

*Primary Examiner* — Kevin Lee
*Assistant Examiner* — Macade Brown
(74) *Attorney, Agent, or Firm* — Dennis T. Griggs; Scott T. Griggs; Griggs Bergen LLP

(57) ABSTRACT

A water supply control assembly is disclosed for cutting off the supply of water to a house or building in the event of excessive water consumption. In one embodiment, a valve is secured to a distribution conduit in fluid communication with a pressurized source of fluid. A water flow sensing unit is secured between the inlet port and the flow discharge port. A magnet is mounted therein to a displaceable member and moved into and out of magnetic field coupling proximity to a timing reed switch in response to the onset and termination of pressurized water flow through the water flow sensing unit. A controller is coupled to the timing reed switch in order to actuate the valve to a water shut-off condition in response to the continuous flow of pressurized water for an elapsed flow time in excess of a preset duty cycle limit.

16 Claims, 4 Drawing Sheets

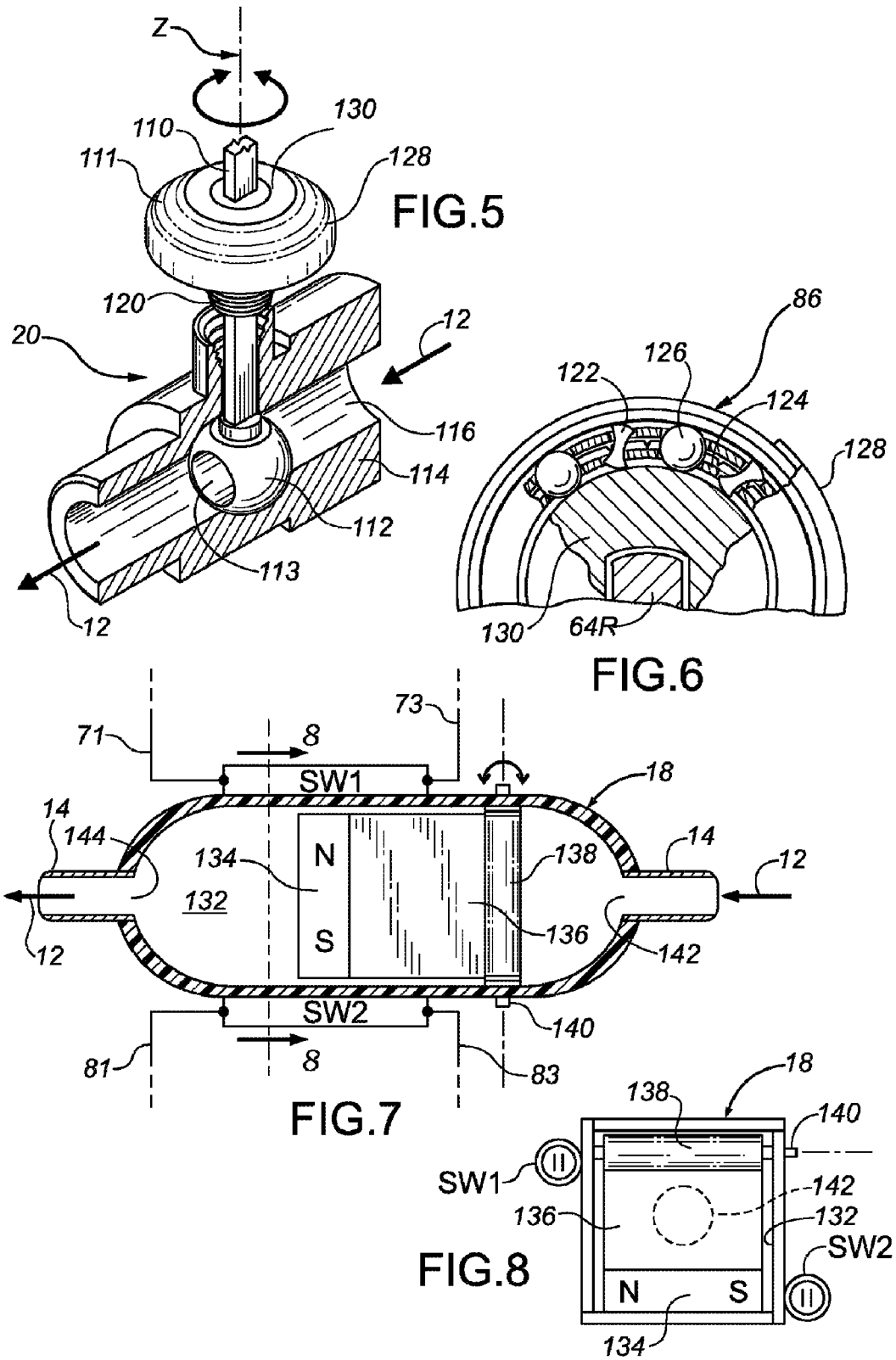

WATER SUPPLY CONTROL ASSEMBLY WITH AUTOMATIC SHUT-OFF AND DUTY CYCLE RESET

TECHNICAL FIELD OF THE INVENTION

This invention relates, in general, to water supply and, in particular, to a water supply control valve assembly which cuts off the supply of water to a house or building in the event of excessive water consumption caused by a leak, plumbing break or open faucet.

BACKGROUND OF THE INVENTION

Catastrophic property damage often occurs in a home or office building as the result of runaway water leakage from a broken or badly leaking water supply line. Since water supply lines generally run throughout a house or building and are concealed behind wall panels, an uncontrolled water leak may result in extensive damage both to the building structure and its contents before the leak is detected. Some typical causes of runaway water leakage are ruptured pipes and loose plumbing; worn-out washing machine hoses, rusted water heaters, aging plumbing fittings, failure of automatic lawn sprinklers and other landscape irrigation equipment, component failure caused by electrolysis, sub-standard plumbing installation practices, sub-standard plumbing equipment, and frozen water lines and hoses.

Other causes include foundation shifting caused by seasonal drought or monsoon rainfall conditions; earthquake damage; failure of automatic water supply equipment at remote unattended facilities, such as livestock watering tanks and oil well pumping rigs; main water line pressure surges; malicious acts of vandalism to property; innocent acts of unsupervised children at play; uncontrolled water leaks that arise when the property is unattended, for example at a vacation retreat, mountain lodge, ranch hideaway, lake house, or at home while the owner is away; and to some extent, by owner neglect due to the simple failure to turn off an indoor water valve or an unattended outside water valve.

These different conditions may arise at any time, especially as building structures age, and create plumbing failures and runaway water leaks. Flooding in a home or other building brings severe water damage resulting in extensive destruction and expense. Massive difficulties arise in the wake of interior structural flooding as families and businesses contend with substantial loss of time, reconstruction expense and loss of usage and peaceful enjoyment of the flooded premises.

Moreover, there is an undisputed, urgent need to conserve our water resources. With the rise of the global population, domestic fresh water reservoirs are becoming increasingly more precious, and as a result, water rationing is becoming mandatory in some communities. Reports by the Chlorine Chemistry Council (CCC) state that Americans and Canadians use more water than any other country—even those that are as equally developed—with a typical family of four using about 350 gallons per day at home for drinking, bathing, clothes and food washing and landscape irrigation. The Texas Water Development Board (TWDB) estimates that agriculture currently accounts for more than half of the state water demand (compared to 40% nationwide).

The TWDB further estimates that if a drought were to occur in the year 2050, almost half (43%) of the municipal demand for water would not be satisfied by current water reservoirs (based on current population projections). Supplying this constant demand for water is further hindered by pipes that have ruptured or broken as a result of faulty soldering, bad connections or freezing weather. According to a report by a leading insurance company, an average of a quarter-million families have their homes ruined and their lives disrupted each winter, all because of water pipes that freeze and burst. In such cases, an eighth-inch (three millimeter) crack in a pipe can leak up to 250 gallons (946 liters) of water a day. Moreover, a single pipe leaking just one gallon of water per minute will account for more than 500,000 gallons of water loss each year (according to the CCC).

Consequently, the U.S. Environmental Protection Agency (EPA), after conducting a national survey among U.S. water systems, recently reported that the United States will need to invest about $138 billion to repair the water distribution infrastructure, with the single largest category of need being the replacement of existing water distribution piping, which comes to about $77 billion. These statistics and projections have encouraged state and local water resource authorities to implement rules and regulations, as well as long-term plans, to meet water demands through conservation, demand reduction and water supply acquisition.

SUMMARY OF THE INVENTION

Even though plumbing equipment of the highest quality may be inspected, maintained and replaced according to a conservative schedule, water leakage of some degree remains likely to occur and should be guarded against because of the possibility of human error, accidents, acts of nature, hidden defects and malicious acts. In keeping with the desire to minimize property damage and conserve water, the water control apparatus presented herein, when coupled to a water supply line, provides a compromise solution in which a small, limited amount of water leakage resulting from such unforeseeable or uncontrollable causes is tolerated only for a short time interval in exchange for a positive and total shut-off of water service.

A water supply control assembly is disclosed for cutting off the supply of water to a house or building in the event of excessive water consumption. In one embodiment, a valve is secured to a distribution conduit in fluid communication with a pressurized source of fluid. A water flow sensing unit is secured between the inlet port and the flow discharge port. A magnet is therein mounted to a displaceable member and moved into and out of magnetic field coupling proximity to a timing reed switch in response to the onset and termination of pressurized water flow through the water flow sensing unit. A controller is coupled to the timing reed switch in order to actuate the valve to a water shut-off condition in response to the continuous flow of pressurized water for an elapsed flow time in excess of a preset duty cycle limit.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 5 is a perspective view, partly in section, of the ball valve used in one embodiment;

FIG. 6 is an elevation view, partly in section, of the one-way, ratchet clutch assembly shown in FIG. 3;

FIG. 7 is a top cut-away view of a water flow sensing station; and

FIG. 8 is a sectional view of the water flow sensing station taken along the line 8-8 of FIG. 7.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
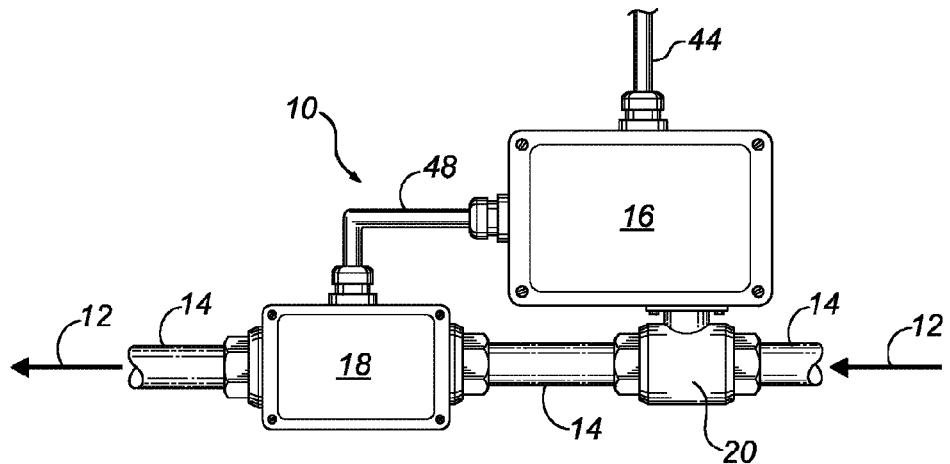
FIG. 1 is side elevation view of one embodiment of a water supply controller connected to a quarter turn ball valve.
Figure 2:
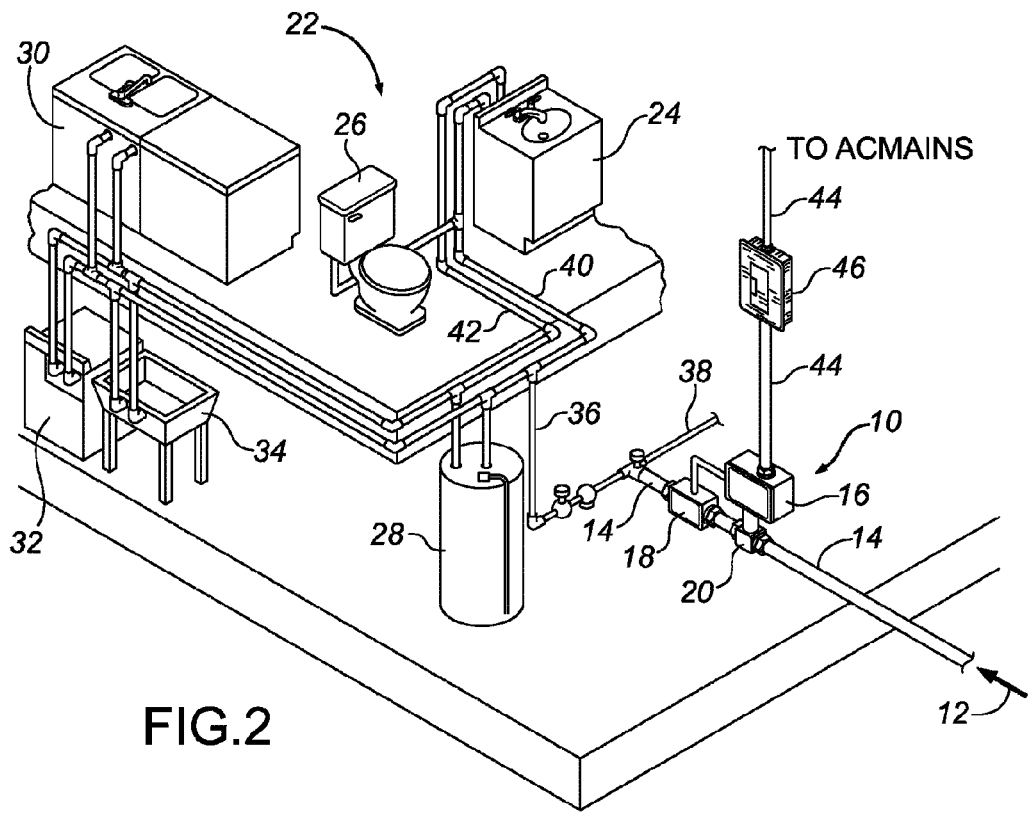
FIG. 2 is a simplified schematic perspective view of the water supply controller of FIG. 1 connected in series with the main water supply line of a single family dwelling.

FIGS. 1 and 2 illustrate one embodiment of a fluid flow control system 10 installed in a domestic water supply system of a single family house which is similar to that found in many homes today. The water supply system 10 receives pressurized water 12 from a public water service utility through an incoming water line 14. The incoming water line 14 passes through a basement wall of the house to supply water to two distribution branches 36 and 38 of the cold water supply.

As illustrated, branch 36 supplies cold water to the building's hot water heater 28, a washing machine 32 located in the basement of the building and a laundry sink 34 also located in the basement of the building. In addition, branch 36 supplies cold water to a main floor kitchen sink 30. Similarly, cold water branch 36 supplies cold water to a main floor bathroom sink 24 and toilet 26. The building's hot water is provided by the hot water heater 28 and is distributed through water lines 40, 42 which supply hot water to the washing machine, sinks and dishwasher. All of these appliances and amenities demanding water are collectively referred to as a water demand load 22, which in the illustrated drawing is depicted as a domestic water demand load 22.

The plumbing system described thus far is quite conventional in that it is commonly found in contemporary homes and commercial buildings. It will be appreciated that there are numerous plumbing connections in such simple domestic water supply systems that are subject to failure. The water supply controller 10 presented herein can easily be installed in such an existing water supply system as well as in new construction. The water supply controller 10 includes a controller 16, a water flow sensing unit 18 and a main water supply valve 20. The controller 16 receives 120 VAC electrical operating power via a circuit breaker 46 connected by No. 12 gauge Romex conductors 60, 62 (FIG. 3) that are routed to the household AC mains through a conduit riser 44, having a power switch 46 embedded therein. A signal wire conduit 48 running between the controller 16 and the water flow sensing unit 18. The main water supply valve 20 is installed in series flow relation in the incoming water supply line 14, preferably inside the basement of the house. Optionally, the control valve assembly 10 may be buried below the soil's surface at a depth sufficient to keep the assembly from freezing. According to one embodiment, the supply valve is a quarter-turn ball valve 20 as shown in FIG. 5. According to another embodiment, the supply valve is a shuttle valve 88 as shown in FIG. 4.

If a water line should break or begin leaking anywhere in the house, water shut-off will be triggered automatically by the controller 10 in response to the continuous flow of pressurized water for an elapsed flow time in excess of a previously established duty cycle limit. Moreover, the controller must be reset manually, which requires operator intervention to repair the leak and reset the controller before water service can be restored.

The water supply control assembly 10 according to the illustrated embodiment allows pressurized water flow from the main water supply line 14 through the service distribution branches 36, 38 only during a timed water service duty cycle of preset duration. The duty cycle is initiated in response to the onset of water flow through the sensing station unit 18 and is automatically reset to a full duty cycle service value in response to a termination of water flow that occurs prior to duty cycle time-out. That is, the controller duty cycle is automatically reset to the full service value each time water ceases to flow through the sensing station 18 during the course of normal water demand service. Assuming no-load initial conditions, service timing will commence when a faucet is opened or other water load demand is made. Reset to initial no-load conditions will occur automatically each time that all active service demand loads are terminated, so that regular water service is made continuously available for a full duty cycle to satisfy normal load demand.

According to one implementation of the teachings presented herein, water flow from the main supply line 14 is automatically shut-off in response to the flow of pressurized water through the sensing station that continues for an elapsed flow time in excess of the duty cycle limit, thereby minimizing property damage that otherwise would be caused by a run-away water leak. If there is no plumbing failure and automatic shut-off is triggered by deliberate or inadvertent continuation of water service in excess of the duty cycle limit, normal water service is quickly restored by manually resetting the controller to initial conditions with switch 46. This is a minor inconvenience that is considered to be acceptable in exchange for the security of total shut-off that will avoid catastrophic property damage caused by a run-away plumbing failure event.

The main shut-off valve 20 will remain in the valve-closed condition until the controller 16 is manually reset. Water service remains terminated until the property owner takes corrective action and makes any repairs that may be needed to restore normal system operation. Consequently, a plumbing failure event at a remote, unattended location will trigger a complete water service shut-off and thereby avoid catastrophic property damage. The controller 16 can be set to an arbitrary service duty cycle, for example in increments of 15 minutes, 30 minutes, or one hour or more as may be desired to satisfy expected load demands, in which pressurized water will be allowed to flow through the sensing station 18 before being shut-off.

Figure 3:
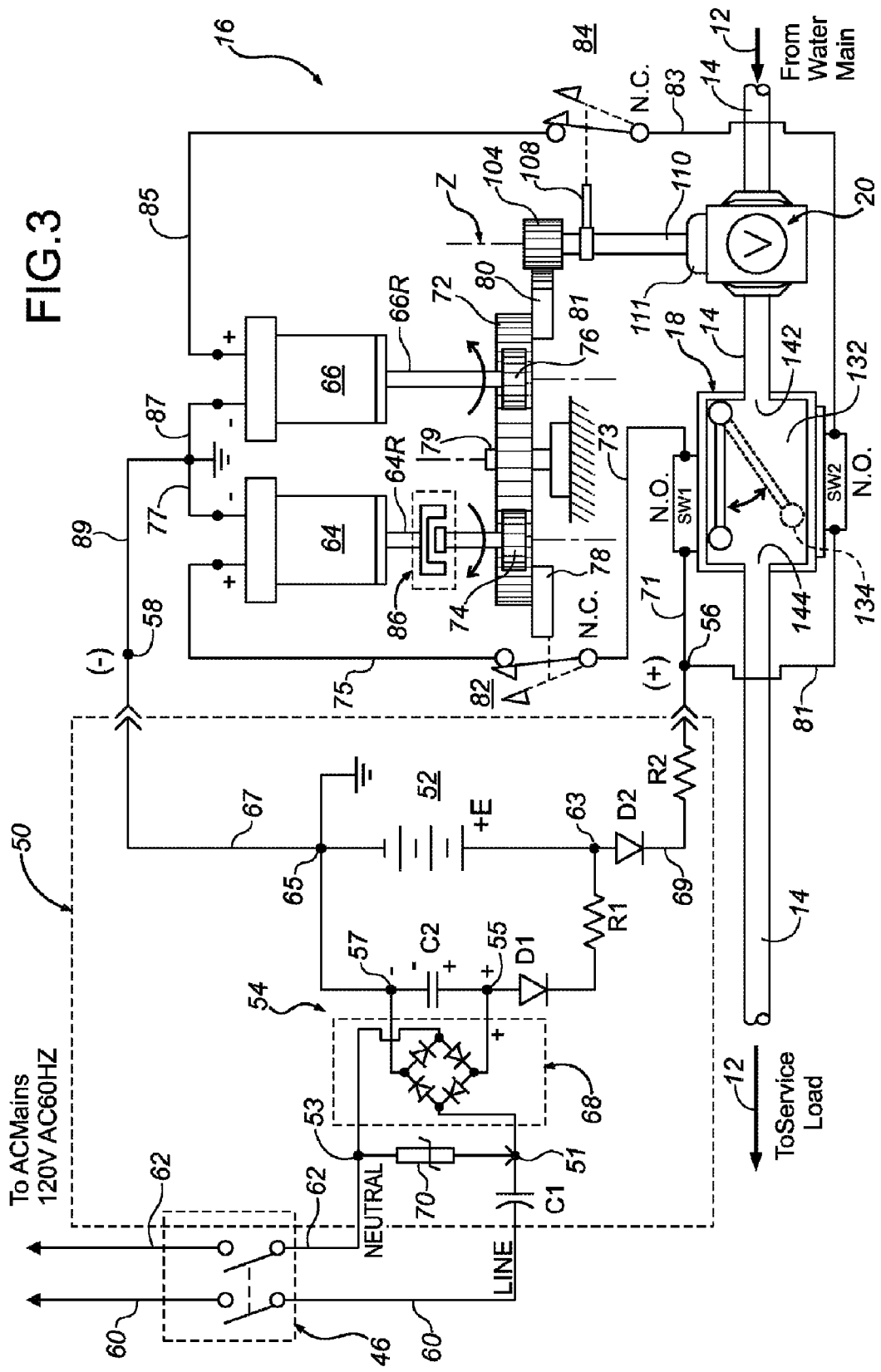
FIG. 3 is a simplified diagram showing the electrical, mechanical and hydraulic connections of the principal components of the dual motor, ball valve water supply controller embodiment of FIG. 1.
Figure 4:
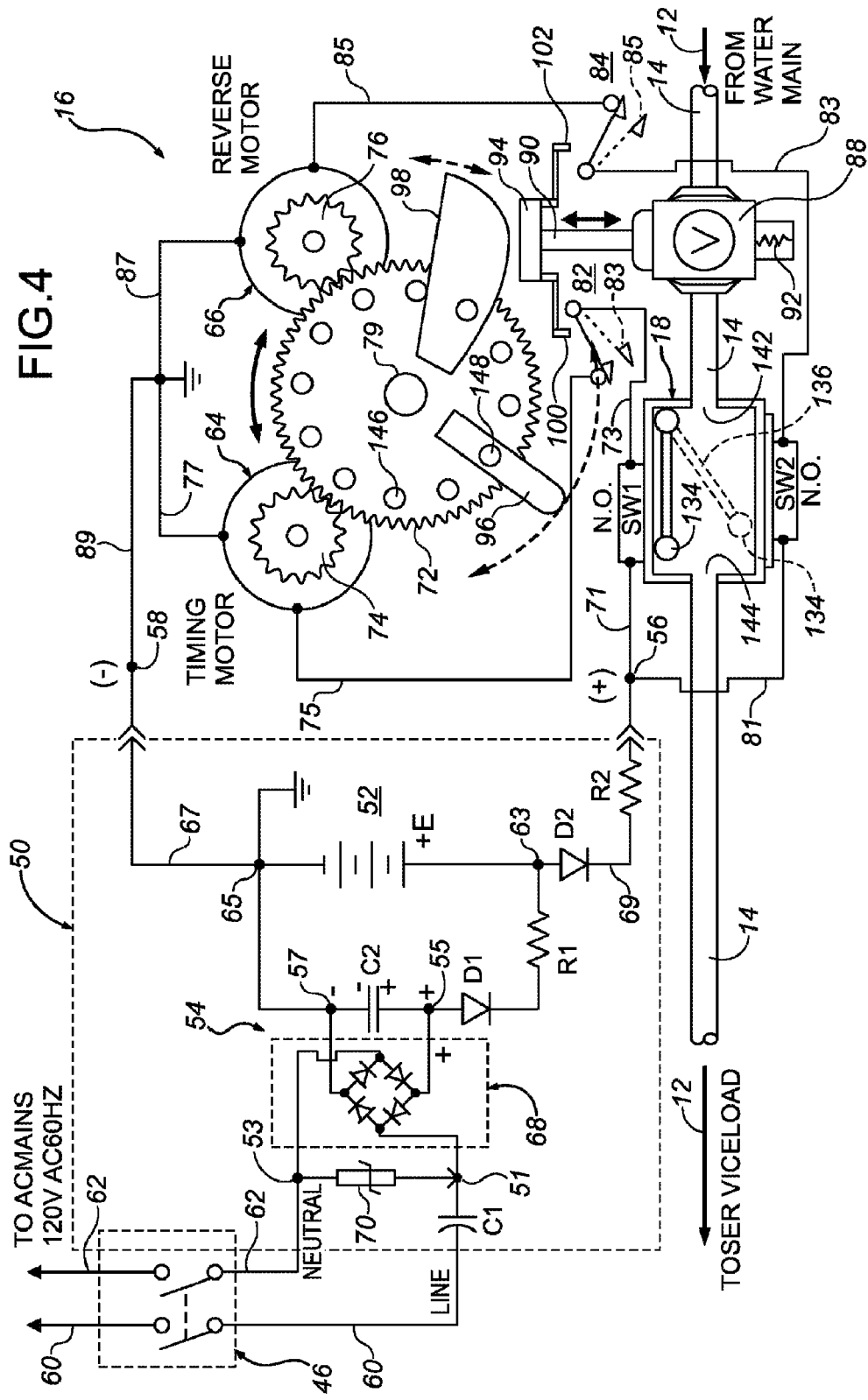
FIG. 4 is a simplified diagram similar to FIG. 3 which illustrates a single motor shuttle valve embodiment of the teachings presented herein.

Referring now to FIG. 3, two DC motors 64, 66 are coupled to a main timing gear 72. The motor-driven timing gear moves toggle arms 78, 108 into and out of engagement with circuit control limit switches 82, 84 for enabling normal service operation, shut-off operation, and reset operation. A one-way clutch 86 allows free-wheeling of the timing motor torque coupling gear 74 during reverse drive operation. As will be discussed in further detail below, the one-way clutch arrangement or a motor reversing arrangement may be utilized to return (or rotate) the main timing gear to the full duty cycle service value or position. An input node 56 (positive) and an input node 58 (negative) are coupled to an AC to DC converter circuit 50 for providing power to the components.

More particularly, the circuit 50 includes the line conductor 60 and the neutral conductor 62 having the switch 46 for selectively interrupting power therethrough. The line conductor 60 drives electricity through capacitor C1 to input node 51 while the neutral conductor 62 is positioned similarly to an input node 53. A varistor 70 connects input node 53 to input node 51 in order to protect the circuit 50 against excessive transient voltages. The line conductor 60 and the neutral conductor 62 are respective inputs to the full wave bridge rectifier 68 which converts the AC input current into DC output current, having connections at output nodes 55, 57; between which in a series relationship, capacitor C2 is located. This arrangement defines a battery charging circuit 54. The output node 55 is also positioned in a current-coupled fashion with diode D1, resistor R1, and battery terminal 63, which is designated as a positive battery terminal of battery 52. The output node 57, on the other hand, is coupled directed to a battery terminal 65 of the battery 52. As shown, the battery 52 is coupled by charging conductor 67 to the aforementioned input node 58. Additionally, a diode D2 and resistor R2 daisy-chain couple charging conductor 69 to the previously mentioned input node 56. With this arrangement, the battery 52 is prepared to power any required reset, regardless of the power conditions to any house or commercial structure, for example.

An input node 56 (positive) and an input node 58 (negative) are coupled to the AC to DC converter circuit 50. The input node 56 is located in electrical communication with each of timing reed switch SW1 and reverse reed switch SW2 by way of signal conductor 71 and pawl spur 81, respectively. The timing reed switch SW1 and reverse or reversing reed switch SW2 may comprise a sensing means and include sensors and switches other than reed switches. Signal conductor 73 connects the timing reed switch SW1 to the toggle arm 78. A pawl spur 81 and switch arm 8 connect the revere reed switch SW2 to a limit switch 84. It should be appreciated that although a particular electrical circuit 50 is depicted for powering the water supply control assembly 10, other electrical circuits and architectures are within the teachings presented herein.

Referring now to FIGS. 3 and 6, the clutch 86 includes clutch slips 122, race ring 124, roller ball bearings 126, an exterior surface 128 of a collar 111 (FIG. 5), and a shaft insert collar 130, which is coupled to the timing motor 64. A pair of cooperating rotary track members are illustrated as the race ring 124 with roller ball bearings 126 and clutch slips 122 interposed therebetween. The clutch slips 122 press the roller ball bearings 126 into operative engagement and in one embodiment, the clutch slips 122 pivot under action of the centrifugal force to cease the bearing of the roller ball bearings 126.

Referring to FIGS. 3, 7, and 8, the water flow sensing station or unit 18 has a flow sensing chamber 132 enclosed by a sealed housing 133, preferably made of a non-conductive plastic material. The flow chamber housing 133 has an inlet port 142 and a flow discharge port 144 connected in series flow communication with the incoming water line 14. A displaceable member or flow vane or paddle 136 is mounted on an axle 140 for pivotal movement in the flow stream of pressurized water 12 as it flows through the sensing chamber 132. A permanent bar magnet 134 is mounted on the tip of the paddle 136, and a coupling sleeve 138 is mounted on the opposite end of the paddle. The coupling sleeve rotates on the axle 140 as the paddle swings up and down in the sensing chamber 132.

The bar magnet 134 is moved into and out of magnetic field coupling proximity to a timing reed switch SW1 and a reversing reed switch SW2 in response to the onset and termination of pressurized water flow through the water flow sensing unit 18, respectively, by way of the inlet port 142 and flow discharge port 144. The bar magnet 134 is moved upwardly against the pull of gravity into magnetic field coupling proximity to the normally open (N.O.) timing reed switch SW1 in response to pressurized water flow across the paddle 136 and through the flow chamber 132. The timing reed switch SW1 senses the magnetic field of the bar magnet 134 and then turns ON in response to the magnetic field and connects DC operating current through conductors 73, 75 to the timing motor 64, thereby enabling timing motor operation only while pressurized water is flowing through the sensing station.

The timing motor 64 is coupled to speed reduction gearing (not shown) that drives the main timing gear 72 mounted on a main gear axle 79 at a relatively slow speed, for example ¾ revolution per hour (RPH). The main timing gear carries a toggle arm 78 toward actuating engagement with a normally closed, duty cycle limit switch 82 during drive operation of the timing motor. The reversing motor 66 operates at a relative fast speed, for example 1800 RPM, for quickly resetting the main timing gear 72 to the full duty cycle position. The timing gear 72 also drives a toggle arms 80, 108, connected by pawl spur 81, toward toggle engagement with a normally closed, reverse limit switch 84 during reversing drive operation of the reversing motor 66.

When pressurized water flow 12 through the water flow sensing unit or sensing station 18 ceases, that is, flow from the inlet port 142 to the flow discharge port 144 ends, the timing reed switch SW1 is turned OFF. By way of example, during normal load demand operation when a faucet is turned OFF, the bar magnet 134 falls by the pull of gravity away from the timing reed switch SW1. The timing reed switch SW1 turns OFF when the paddle and bar magnet swing away out of coupling proximity and disconnects operating power from the timing motor 64. In the absence of pressurized water flow, the bar magnet drops into magnetic field coupling proximity with the reversing reed switch SW2. The reversing reed switch turns ON in response to the magnetic field and connects DC operating voltage to the reversing motor 66 though conductors 83, 85.

The reversing motor 66 drives the main timing gear 72 in reverse rotation until the normally closed, reversing limit switch 84 is opened in response to engagement by the toggle arm 108 that is carried on the main timing gear. When the reversing limit switch 108 is toggled open, operating voltage is disconnected from the reversing motor 66, at which time the position of the main timing gear 72 is reset and restored to the starting point of a full water service duty cycle.

When pressurized water 12 continues to flow through the sensing station for an interval that exceeds the preset duty cycle limit, for example corresponding with a plumbing leak failure event or an unscheduled load service demand that exceeds the programmed duty cycle, a torque transfer gear 80 mounted on the main timing gear 72 rotates a spur gear 104 on the valve actuator 110, which turns the main water supply valve to the fully closed, OFF position. This turn-off action proceeds at the driving rate of the main drive motor 64, for example ¾ RPH.

Referring to FIGS. 3 and 5, the turn-off driving torque is transmitted to an actuating shaft 110 of the water supply valve 20 through the torque transfer gear 80 and the spur gear 104. The actuating shaft 110 of the water supply valve 20 rotates about axis z and extends through the shaft collar insert of the collar 111 having the exterior surface 128, which is superior to a threaded neck. The water supply valve 20 includes a quarter-turn ball valve 112 having threaded couplings 120 for mating the collar 111 and valve body 114. A flow bore 113 providing for fluid communication through a flow passage 116 within the valve body 114. As depicted, the water supply valve 20 is in the open or operational-on condition wherein pressurized water 12 flows therethrough. Since the effective ratio of torque transfer from the main drive motor to the actuating shaft 110 is about 1:1, a total of 20 minutes will be required to move the valve shaft one-quarter turn from full ON to full OFF to obtain complete closure of the main water supply valve 20. It is during this turn-off time that water would continue to leak in an existing system if a plumbing failure event has occurred. In most cases, however, the water demand load will cease when the use ends. In these instances, the main timing gear 72 returns to its original position in order to reset the preset duty cycle limit.

Simultaneously upon complete valve closure, the toggle arm 78 carried on the main timing gear 72 opens the normally closed, forward limit switch 82, thus removing operating voltage from the main timing motor 64. At the same time, the toggle arm 108 is moved into switch-open actuating engagement with the normally closed, reverse limit switch 84, thus removing operating voltage from the reversing motor 66.

Because the torque output of the main timing motor 64 may be transmitted through the speed reduction gear (not shown), the main timing gear 72 is locked against forward timing rotation when the timing motor is OFF. Consequently, the main water supply valve 20 will remain in the valve closed position until it is manually re-opened and the main timing gear 72 has been manually reset to the full duty cycle position. The forward limit switch 82 and the reversing limit switch 84 also remain locked in the OFF position, so that no operating current can flow to the motors.

The controller thus remains non-operative until the main water supply valve 20 has been manually moved to the full open position by the pulling of switch 46, thus allowing the limit switches to return to their normally closed positions and resetting the main timing gear to the full duty cycle position. When main water supply valve 20 is returned to the fully open position, the sensing station is again pressurized, and the water controller 10 is then restored to the control operating mode.

The water flow sensing function provided by the bar magnet 134 and reed switch components can be produced by rubber boot-protected toggle-type contact switches, located within the water flow chamber 132 of the sensing station 18. Contact engagement by the moveable vane member 136, without the bar magnet, turns the switches ON and OFF in response to the presence or absence of water flow pressure. The same action of motor control is achieved as provided by the bar magnet and reed switch components, and provides a more compact unit.

The speed of the DC motors 64, 66 largely determines the gearing employed. A slow RPH (revolutions per hour) movement of the valve activating arm is preferred as it will allow a wide range of duty cycle increments for water shutoff, for example from 10 minutes to as much as three or more hours can be selected. Whatever duty cycle is chosen is the determining factor in how much water leakage occurs after the load demand service exceeds the preset duty cycle limit.

Referring now to FIG. 4, the water supply controller 16 is mechanically coupled to a shuttle valve 88. This embodiment uses a large diameter timing gear 72 for both the timing-advance and reverse-reset functions. The bar magnet assembly and reed switches are used in the same way as shown in the ball valve embodiment of FIG. 3. The large diameter timing gear provides 10-minute to three (or more) hour water duty cycle options. DC operating voltage for the drive motors is provided by an AC to DC converter circuit 50 as shown in FIGS. 3 and 4. Also, similar to FIG. 3, the input node 56 (positive) and the input node 58 (negative) are coupled to the AC to DC converter circuit 50. The input node 56 is located in electrical communication with each of timing reed switch SW1 and reverse reed switch SW2 by way of signal conductor 71 and pawl spur 81, respectively. Signal conductor 73 connects the timing reed switch SW1 and a limit switch 82 having a switch arm 83. With respect to the reverse reed switch SW2, a switch arm 85 connects to a limit switch 84 having a switch arm 85.

With respect to input node 58, signal conductor 89 branches into signal conductors 77, 87 for driving signals to main timing motor 64 and reversing motor 66, respectively. By way of respective spur gears 74, 76, the timing motor 64 and the reversing motor 66 are located in a geared relationship with the main timing gear 72, which, in the implementation illustrated, operates on a main gear axle 79. Index holes 146 and index pins 148 provide coupling of toggle arms 96, 98 to the main timing gear 72. An actuating shaft 90 having a bumper cap is disposed in contact distance from the toggle arms 96, 98. As depicted, the actuating shaft 90 operates the shuttle valve 88, which includes a spring 92 for biasing the shuttle valve into an operational-on condition. Actuating shaft 90 includes fingers 100, 102. Signal conductors 75, 85, which may be considered switch arms, respectively complete communication from the timing reed switch SW1 and the reversing reed switch SW2 to the timing motor 64 and the reverse motor 66.

In a manner to that previously discussed in FIG. 3, the operation of the bar magnet 134 in cooperation with the timing reed switch SW1 and the reverse reed switch SW2 drives signals to the timing motor 64 and the reverse motor 66. The motors respectively drive the spur gears 74, 76, which, in turn, rotate the main timing gear 72. The rotation of the main timing gear 72 causes toggles arm 96, 98 to contact the bumper cap 94 of the actuating shaft 90. Continued contact, in response to the timing reed switch SW1 being ON in response to the timing reed switch reading a continuous flow of pressurized water an elapsed time in excess of a preset duty cycle, actuates the toggle arms 96, 98 sequentially into further contact with bumper cap 94, thereby closing the value, i.e., a shut-off condition, once the preset duty cycle is exceeded. Similar to the description in FIG. 3, consequently, the supply valve 88 will remain in the valve closed position until it is manually re-opened, through action of the reverse motor 66 and the spring 92, and the main timing gear 72 has been manually reset to the full duty cycle position.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A water supply control assembly for cutting off the supply of water to a house or building in the event of excessive water consumption, the water supply control assembly comprising:

a valve secured to a distribution conduit in series flow communication with a pressurized source of fluid;

a water flow sensing unit secured to a water demand load, the water flow sensing unit including an inlet port and a flow discharge port connected in series flow communication with the distribution conduit and the water demand load;

a magnet mounted to a displaceable member, the displaceable member moveably secured within the water flow sensing unit between the inlet port and the flow discharge port;

the magnet being moved into and out of magnetic field coupling proximity to a timing reed switch in response to the onset and termination of pressurized water flow through the water flow sensing unit from the distribution conduit to the water demand load;

the timing reed switch sensing the magnetic field of the magnet and then turning ON in response to the magnetic field;

a controller coupled to the timing reed switch, the controller, in response to the timing reed switch, configured to actuate the valve to a water shut-off condition in response to the timing reed switch reading a continuous flow of pressurized water for an elapsed flow time in excess of a preset duty cycle limit;

the controller including a first toggle arm carried on a main timing gear to open a normally closed forward limit switch to remove operating voltage from a main timing motor upon complete closure of the valve; and the controller including a second toggle arm carried on the main timing gear to open a normally closed reverse limit switch, to remove operating voltage from a reverse motor at the same time as the forward limit switch is opened.

2. The water supply control assembly as recited in claim 1, wherein the valve comprises a member of the group consisting of ball valves and shuttle valves.

3. The water supply control assembly as recited in claim 1, wherein the demand load comprises an amenity selected from the group consisting of lavatories, toilets, hot water heaters, kitchen sinks, washing machines, laundry sinks, and combinations thereof.

4. The water supply control assembly as recited in claim 1, wherein the displaceable member comprises a flow vane mounted for pivotal movement in the continuous flow of pressurized water.

5. The water supply control assembly as recited in claim 1, wherein the displaceable member comprises a coupling sleeve mounted on the opposite end of a paddle, the coupling sleeve rotating on an axle as the paddle swings up and down in the water flow sensing unit.

6. The water supply control assembly as recited in claim 1, wherein the controller further comprises a second motor and the main timing gear performs both timing-advance and reverse-reset functions with respect to the preset duty cycle limit.

7. The water supply control assembly as recited in claim 1, further comprising a switch for manual reset of the preset duty cycle limit following an elapsed flow time in excess of a preset duty cycle limit and the establishment of the water shut-off condition.

8. The water supply control assembly as recited in claim 1, further comprising a reversing reed switch for sensing the magnetic field of the magnet and then turning ON in response to the magnetic field, the controller being coupled to the reversing reed switch and, in response to the reversing reed switch, configured to reset the preset duty cycle limit.

9. The water supply control assembly as recited in claim 1, wherein the preset duty cycle limit comprises a value between 10 minutes and three hours.

10. The water supply control assembly as recited in claim 1, wherein the water supply control assembly comprises a configuration for placement in a basement.

11. The water supply control assembly as recited in claim 1, wherein the water supply control assembly comprises a configuration for placement below the soil's surface at a depth sufficient to keep the assembly from freezing.

12. A water supply control assembly for cutting off the supply of water to a house or building in the event of excessive water consumption, the water supply control assembly comprising:

a valve secured to a distribution conduit in series flow communication with a pressurized source of fluid;

a water flow sensing unit secured to a water demand load, the water flow sensing unit including an inlet port and a flow discharge port connected in series flow communication with the distribution conduit and the water demand load;

a magnet mounted to a displaceable member, the displaceable member moveably secured within the water flow sensing unit between the inlet port and the flow discharge port;

a controller including a timing motor and a reverse motor for operating a main timing gear, the controller advancing rotation of the main timing gear to actuate the valve to a water shut-off condition in response to a continuous flow of pressurized water for an elapsed flow time in excess of a preset duty cycle limit;

a first switch coupled to the controller, the first switch sensing the magnetic field of the magnet and then turning ON in response to the magnetic field in order to signal the advancement of the rotation of the main timing gear;

a second switch coupled to the controller, the second switch sensing the magnetic field of the magnetic and then turning ON in response to the magnetic field in order to signal the resetting of the rotation of the main timing gear to the full duty cycle service value, the controller including a first toggle arm carried on the main timing gear to open a normally closed forward limit switch to remove operating voltage from the timing motor upon complete closure of the valve;

the controller including a second toggle arm carried on the main timing gear to open a normally closed reverse limit switch, to remove operating voltage from a reverse motor at the same time as the forward limit switch is opened; and the magnet being moved into and out of magnetic field coupling proximity to the first switch and the second switch in response to the onset and termination of pressurized water flow through the water flow sensing unit from the distribution conduit to the water demand load.

13. The water supply control assembly as recited in claim 12, wherein the valve comprises a member of the group consisting of ball valves and shuttle valves.

14. The water supply control assembly as recited in claim 12, wherein the demand load comprises an amenity selected from the group consisting of lavatories, toilets, hot water heaters, kitchen sinks, washing machines, laundry sinks, and combinations thereof.

15. The water supply control assembly as recited in claim 12, wherein the second switch activates a reverse motor to release a clutch and return the main timing gear to the full duty cycle service value.

16. A water supply control assembly for cutting off the supply of water to a house or building in the event of excessive water consumption, the water supply control assembly comprising:

a valve secured to a distribution conduit in series flow communication with a pressurized source of fluid;

a water flow sensing unit secured to a water demand load, the water flow sensing unit including an inlet port and a flow discharge port connected in series flow communication with the distribution conduit and the water demand load;

a magnet mounted to a displaceable member, the displaceable member moveably secured within the water flow sensing unit between the inlet port and the flow discharge port;

a controller including a timing motor and a reverse motor for operating a main timing gear, the controller advancing rotation of the main timing gear to actuate the valve to a water shut-off condition in response to a continuous flow of pressurized water for an elapsed flow time in excess of a preset duty cycle limit;

sensing means coupled to the controller for sensing, by way of the position of the magnet, the onset and termination of pressurized water flow through the water flow sensing unit from the distribution conduit to the water demand load;

the controller including a first toggle arm carried on the main timing gear to open a normally closed forward limit switch to remove operating voltage from the timing motor upon complete closure of the valve; and the controller including a second toggle arm carried on the main timing gear to open a normally closed reverse limit switch, to remove operating voltage from the reverse motor at the same time as the forward limit switch is opened.

* * * * *